United States Patent
Okamoto et al.

(10) Patent No.: US 6,843,405 B2
(45) Date of Patent: Jan. 18, 2005

(54) METHOD OF JOINING METALLIC MATERIALS

(75) Inventors: Kazutaka Okamoto, Hitachi (JP); Satoshi Hirano, Hitachi (JP); Masahisa Inagaki, Hitachi (JP); Yasuhisa Aono, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/358,178

(22) Filed: Feb. 5, 2003

(65) Prior Publication Data

US 2004/0057782 A1 Mar. 25, 2004

(30) Foreign Application Priority Data

Sep. 20, 2002 (JP) .......................... 2002-274252

(51) Int. Cl.[7] .............................................. B23K 20/12
(52) U.S. Cl. ...................................... 228/112.1; 228/2.1
(58) Field of Search ........................... 228/112.1, 113, 228/114, 114.5, 2.1, 2.3

(56) References Cited

U.S. PATENT DOCUMENTS

| 6,334,568 | B1 | * | 1/2002 | Seeds ...................... 228/114.5 |
| 6,460,750 | B1 | * | 10/2002 | Coletta et al. ............... 228/2.1 |
| 6,536,651 | B2 | * | 3/2003 | Ezumi et al. ............ 228/112.1 |
| 6,554,177 | B2 | * | 4/2003 | Foster et al. ............. 228/112.1 |
| 6,676,004 | B1 | * | 1/2004 | Trapp et al. ................. 228/2.1 |
| 2002/0027153 | A1 | | 3/2002 | Sayama et al. |

FOREIGN PATENT DOCUMENTS

| DE | 36 26 009 | 2/1987 |
| EP | 1 201 347 | 5/2002 |
| EP | 1 279 458 | 1/2003 |
| JP | 11-285862 | 10/1999 |
| JP | 2001-47261 | 2/2001 |
| JP | 2002-66758 | 3/2002 |
| WO | WO 01/85384 | 11/2001 |

* cited by examiner

Primary Examiner—Kiley Stoner
(74) Attorney, Agent, or Firm—Antonelli, Terry, Stout & Kraus, LLP

(57) ABSTRACT

Different metallic materials are joined in such a manner that friction heat generated by friction between a rotating probe made of a hard material and one of the metallic materials having a lower mechanical strength or a lower melting point than the other to effect plastic flow of the one material and the probe is inserted into a pit formed in a joint zone of the other material to fill the pit with the plastic flow material.

21 Claims, 12 Drawing Sheets

METHOD OF JOINING METALLIC MATERIALS

FIELD OF THE INVENTION

The present invention relates to a method of joining metallic materials by means of a rotating probe, and also relates to a joint as well.

DESCRIPTION OF THE PRIOR ART

There is a method for joining metallic materials that uses a rotating probe. See, for example, WO93/10935 (=Japanese Patent No. 2,712,838). This method is called a friction stir welding method. In the friction stir welding method, a rotating probe is inserted into a joining portion of metallic materials to be joined. The joining is carried out by mixing of metallic materials that is caused by plastic flow of the materials in the joining portion due to friction heat generated between the rotating probe and the materials. In the friction stir welding method, the joining is performed without melting of the materials.

DESCRIPTION OF THE INVENTION

If different kinds of materials are joined by a welding method, intermetallic compounds are formed at the interface of the materials. Even in the friction stir welding method, the intermetallic compounds are formed in general. The intermetallic compounds are formed by recomposing one component in one material with the other component in the other material. The compounds are generally high in mechanical strength, but are brittle. Thus, it is better to avoid the formation of the compounds at the interface of the jointed materials.

An object of the present invention is to provide a new method for joining that can suppress the formation of the intermetallic compounds at the joining interface.

The present invention is featured by forming a pit or concave in a joining portion of one of the materials to be joined, and then the joining portion of the other material is plasticized to generate plastic flow that enters into the pit. In the present invention, the two materials are not metallurgically bonded where there is no mixing of the two materials, but the materials are joined by so-called a mechanical joining method wherein the pit of one materials is filled with the other material. Since the materials are not mutually mixed with each other in the present invention, no intermetallic compounds are formed at the interface between the two materials, or only a very small amount of the compounds is formed so that there is no adverse effect due to the compounds on reliability of the joint. Because the joining method of the present invention is mechanical one, the method is called "joining", but not "bonding" in the specification.

DETAILED EXPLANATION OF THE PREFERRED EMBODIMENTS

In preferred embodiments of the present invention, a rotating probe is used for carry out joining of the metallic materials. The embodiments will be explained by way of drawings.

Figure 1:
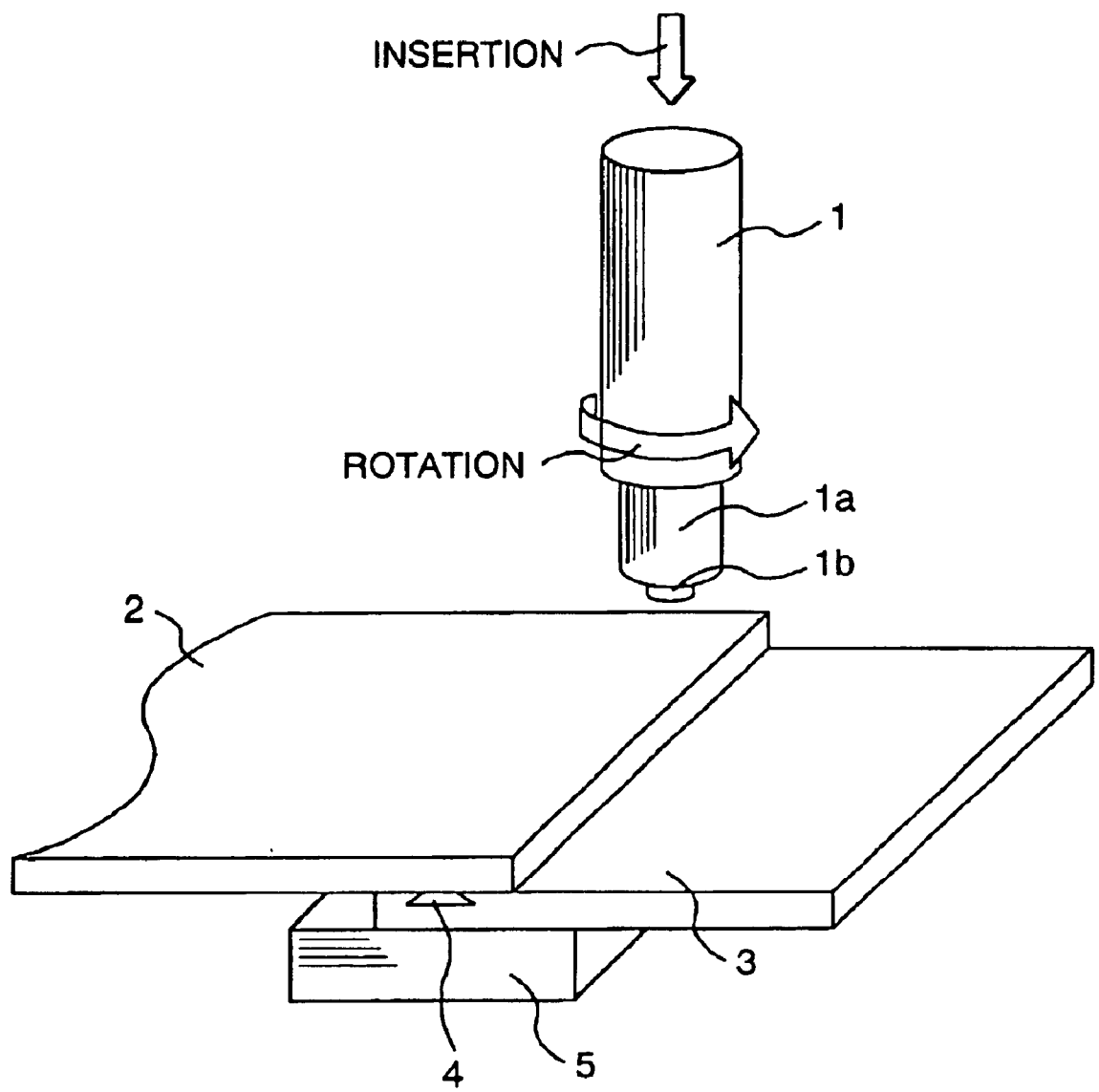
FIG. 1 is a perspective view showing the joining method of the present invention.
Figure 2:
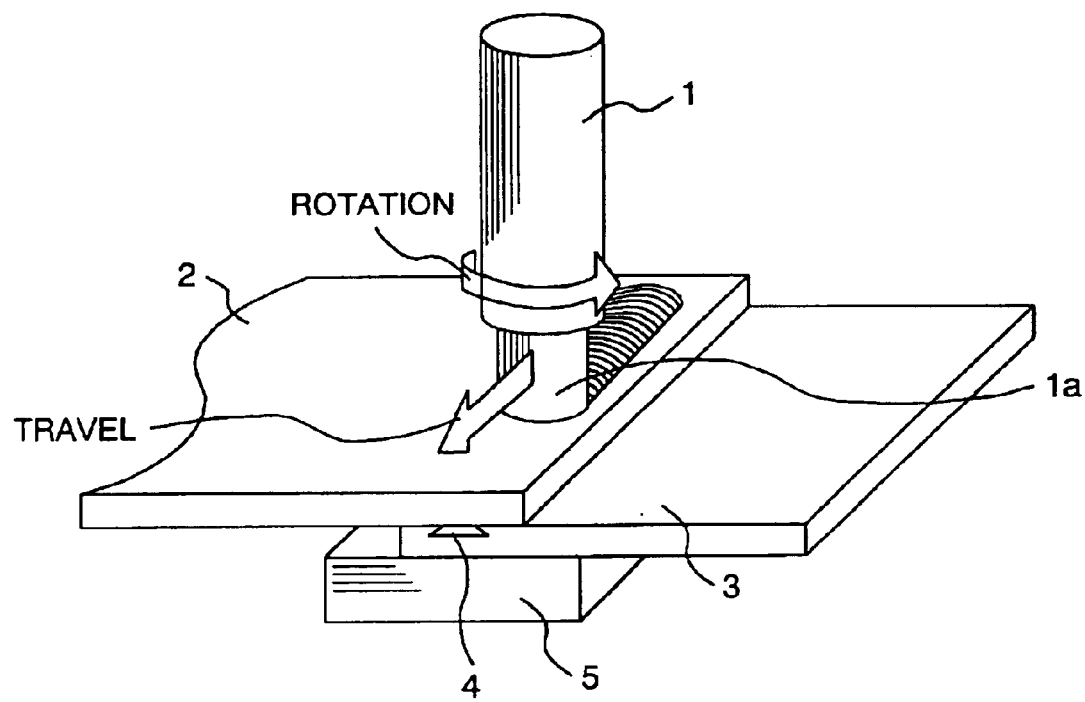
FIG. 2 shows a perspective view of a step of the method of the present invention.
Figure 3:
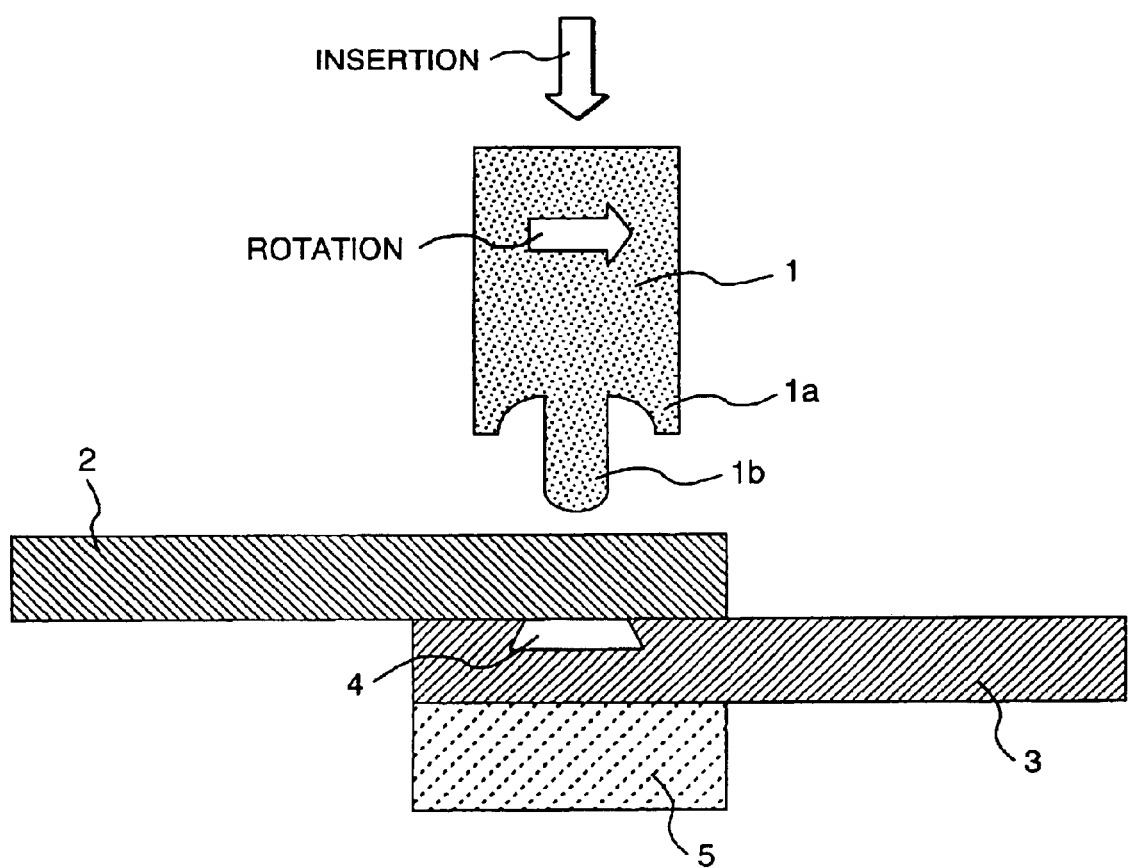
FIG. 3 is a sectional view showing an arrangement of material and a probe.

As shown in FIG. 1, which is a perspective view of arrangement, a pit 4 or concave 4 is formed in a joining portion of one material 3. The Joining portion of the other material 2 is placed above the pit 4. A backing plate 5 is provided beneath the joining portion of the one material 3. FIG. 1 is the perspective view, and FIG. 3 is a sectional view of FIG. 1. The joining portion means, in the broadest sense, a portion wherein materials 2, 3 are overlapped, but in the narrowest sense, a portion composed of the pit 4 of the material and material 3 superposed on the pit 4.

When joining aluminum or its alloys and steel, steel becomes material 3, and pit 4 is preferably formed therein. When joining aluminum or its alloys and copper alloys, the copper alloys become material 3 to which pit 4 is preferably formed. The reason of the material selection is that plastic flow of a material that has a lower mechanical strength or has a lower melting point is made more easily than material of higher mechanical strength or a higher melting point. Further, a probe can be made of soft material, which leads to an easy choice of materials for the probe.

In joining different materials by the friction mixing method, it is an important point to consider whether or not a joining temperature should be one at which plastic flow of the materials takes place. If a lower plastic flow temperature of material is selected, mixing of the other material will take place, which leads to fault of joining due to intermetallic compounds. If an average temperature of the plastic flow temperatures of the two materials is selected, mixing of the one material will be insufficient and there is a risk that the other material may be melted.

According to the present invention, only one material is plasticized by friction heat to flow, but there is no need to stir the other material. Thus, the problem found in the conventional friction stir welding will not occur.

When the method of the present invention is practiced, materials 2, 3, backing plate 5 and a cramp not shown are arranged as shown in FIGS. 1, 3. Then, the probe 1 is rotated at high speed and is inserted into the joining portion of material 2. Cyclic movement of the inserted probe 1 is effected by its rotation in relation with material 2. This rotation movement generates heat by friction between the probe 1 and material 2, followed by plastic flow of the material 2. When the probe 1 is inserted more deeply until its tip reaches the bottom of pit 4 formed in material 3, portion of plastic flow of the material 2 is filled in the pit 4. After filling of pit 4 with plastic flow of material 2, probe 4 is withdrawn from the joining zone of the materials 2, 3. As is shown in FIG. 5, probe 4 is withdrawn from the joining zone and materials 2, 3 are joined.

Figure 5:
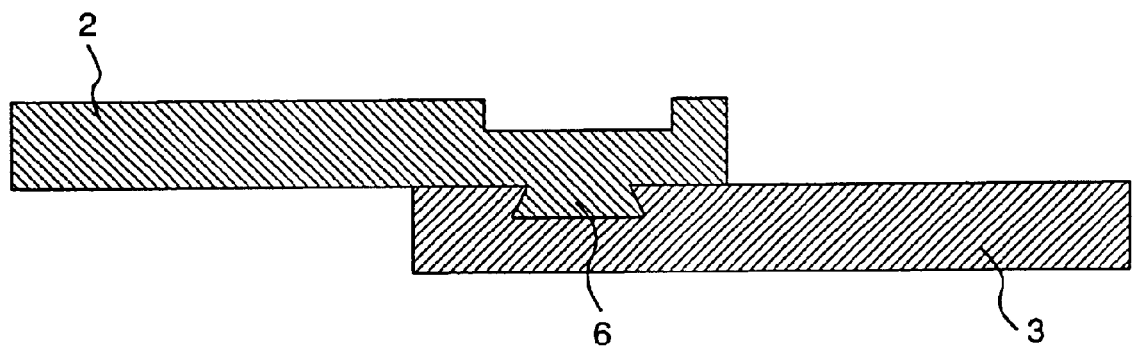
FIG. 5 shows a sectional view of a joint obtained by the method of the present invention.

In FIG. 5 a dip is found in the surface of material 2, which is caused by filling of part of material 2 into pit 4 to form filling part 6. If the dip in the surface of material 2 is eyesore, the surface can be machined to remove the dip.

In the present invention, since the probe 1 is inserted into material 2, a material for the probe 1 should be harder than material 2. The shape of the probe 1 is columnar as shown in FIGS. 1, 2, 3 and 4. A preferable shape is one that has a shoulder 1a having a larger diameter and a pin 1b having a smaller diameter.

If the pin 1b of the rotating probe 1 is inserted into material 2, the material 2 effects plastic flow around the area in which pin 1b is inserted. The shoulder 1a of the probe 1 prevents flowing out of plastic flow of material 2. When the tip of pin 1b is further inserted into so as to reach pit 4 of material 3, plastic flow of material 2 is pushed into pit 4 to fill it.

Figure 4:
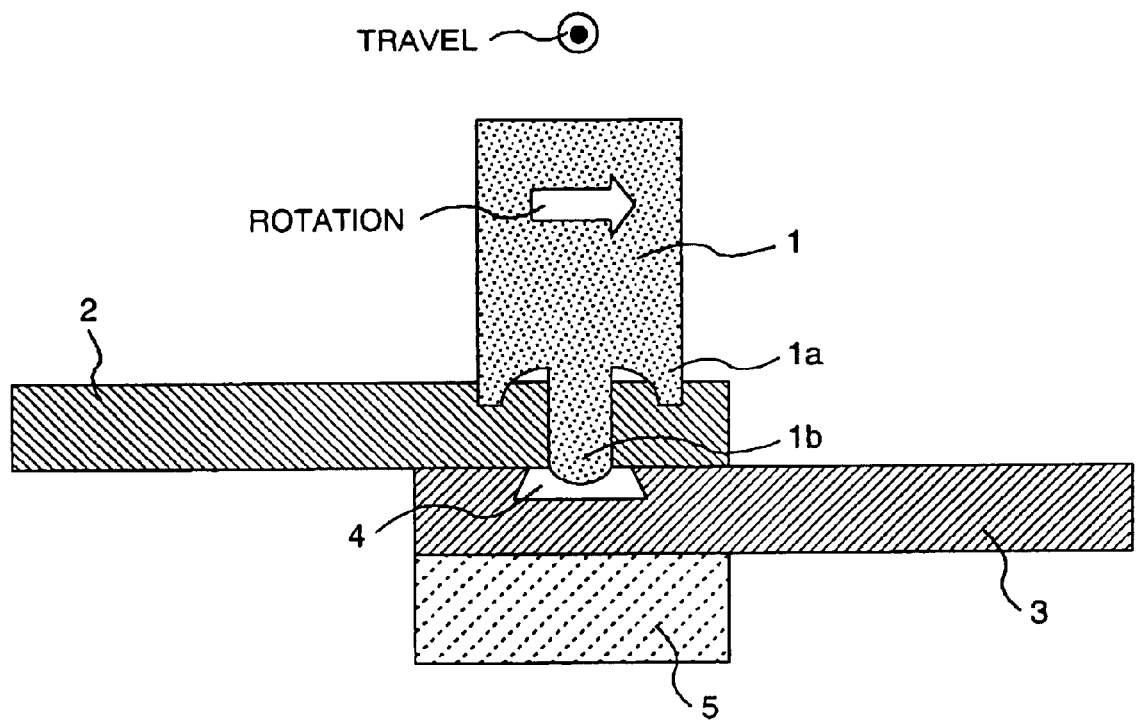
FIG. 4 shows a sectional view of a step of the method of the present invention.

In order to prevent flowing out of plastic flow material 2 from the portion around probe 1, a diameter of the shoulder 1a should preferably be larger than that of pit 4 of material 3. When the tip of pin 1b is inserted into pit 4, shoulder 1a that has a recess around the root of pin 1b as shown in FIGS. 3, 4 makes plastic flow material 2 filled into pit 4. That is, the shoulder 1a should preferably have a sectional structure wherein a height of the shoulder is reduced outwardly from the root of the pin. According to this structure, plastic flow of material 2 is confined in the recess of shoulder 1a, so that the plastic flow of material 2 is easily filled in pit 4 when pin 1b is pressed down. When pin 1b is inserted into pit 4, it is preferable to let shoulder 1a contact with the surface of material 2, or more preferably to let the tip of shoulder 1a bite into the surface of material 2 as shown in FIG. 4. As a result, plastic flow of material 2 does not flow out from the tip of the shoulder 1a.

In order to let the tip of shoulder 1a contact with the surface of material 2 or to let the tip bite slightly into the surface, it is preferable to select the proper length of pin 1b, a proper angle of shoulder 1a etc. in accordance with thickness of materials, etc.

Insertion of probe 1 is stopped immediately before pin 1b contacts with the bottom of pit 4. If pin 1b is inserted into the material 3, plastic flow of material 3 takes place to form intermetallic compounds at the interface in the joint.

Figure 6:
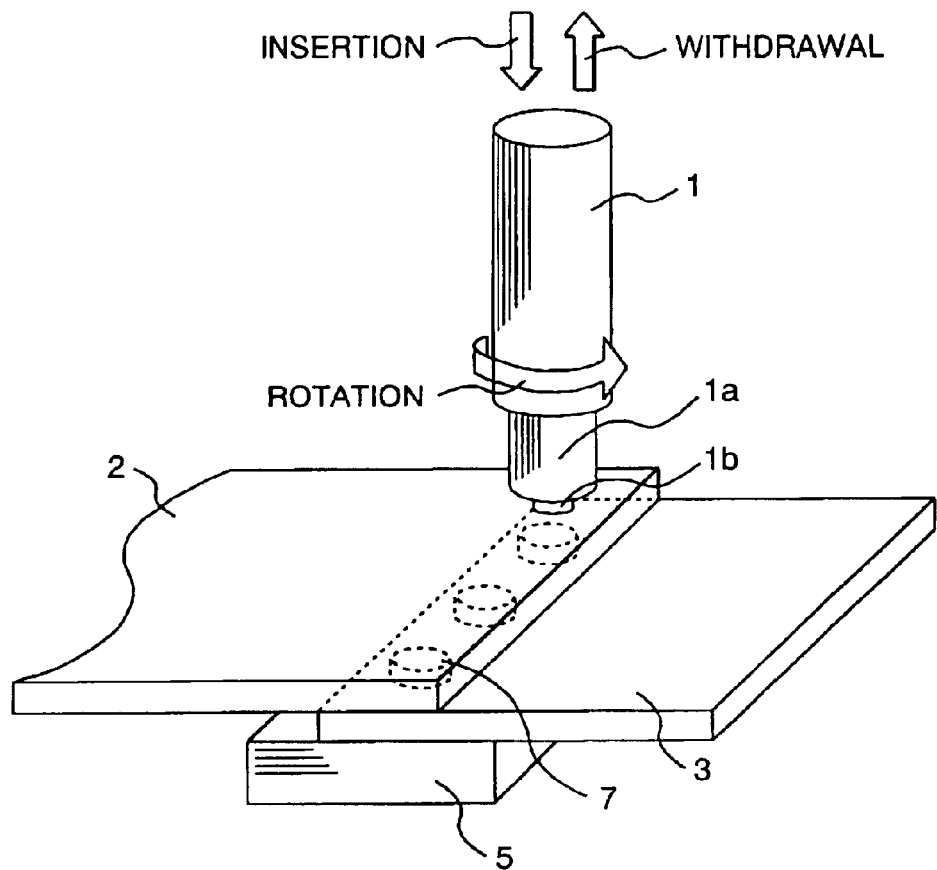
FIG. 6 shows another example of the present invention.

Pit 4 of material 3 may extend in the lateral direction, or pit 4 may have a round contour as shown in FIG. 6. When pit 4 extends laterally, probe 1 is moved along pit 4.

In examples shown in FIGS. 1 to 4, pit 4 has a shape such that the diameter at the entrance is smaller than that of the bottom. This structure is preferably employed to connect plates. The filling 6 of material 2 comes hardly out from pit 4 because the entrance has a smaller size than that of the bottom.

Figure 7:
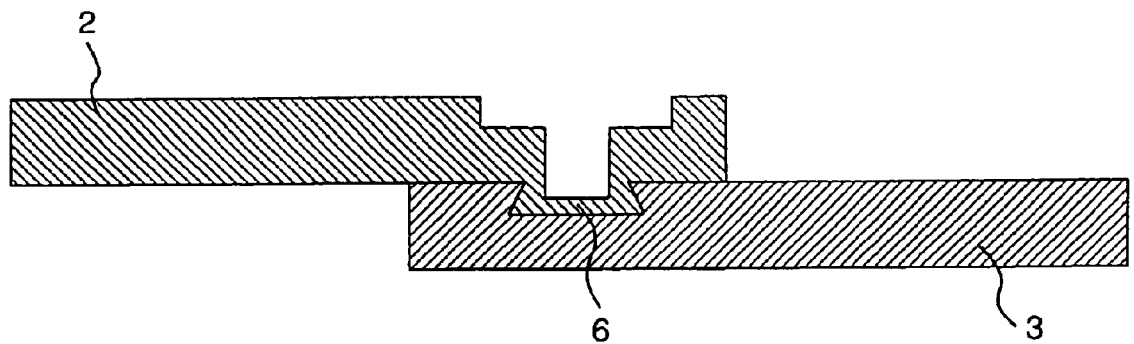
FIG. 7 shows a sectional view of a joint obtained in the another example.

As shown in FIG. 6, round pits 7 whose sectional view is trapezoid are formed in the joining zone of material 3. When joining with material 2, the probe 1 that rotates at high speed is inserted into material 2 and rotation of the probe is stopped immediately before pin 1b contacts with material 2. The state is kept for about 10 seconds, and then the probe 1 is withdrawn from the joining portion. The joint connected by this method is provided with a double portion as shown in FIG. 7. The depressed portion may be removed by machining, if necessary.

Figure 8:
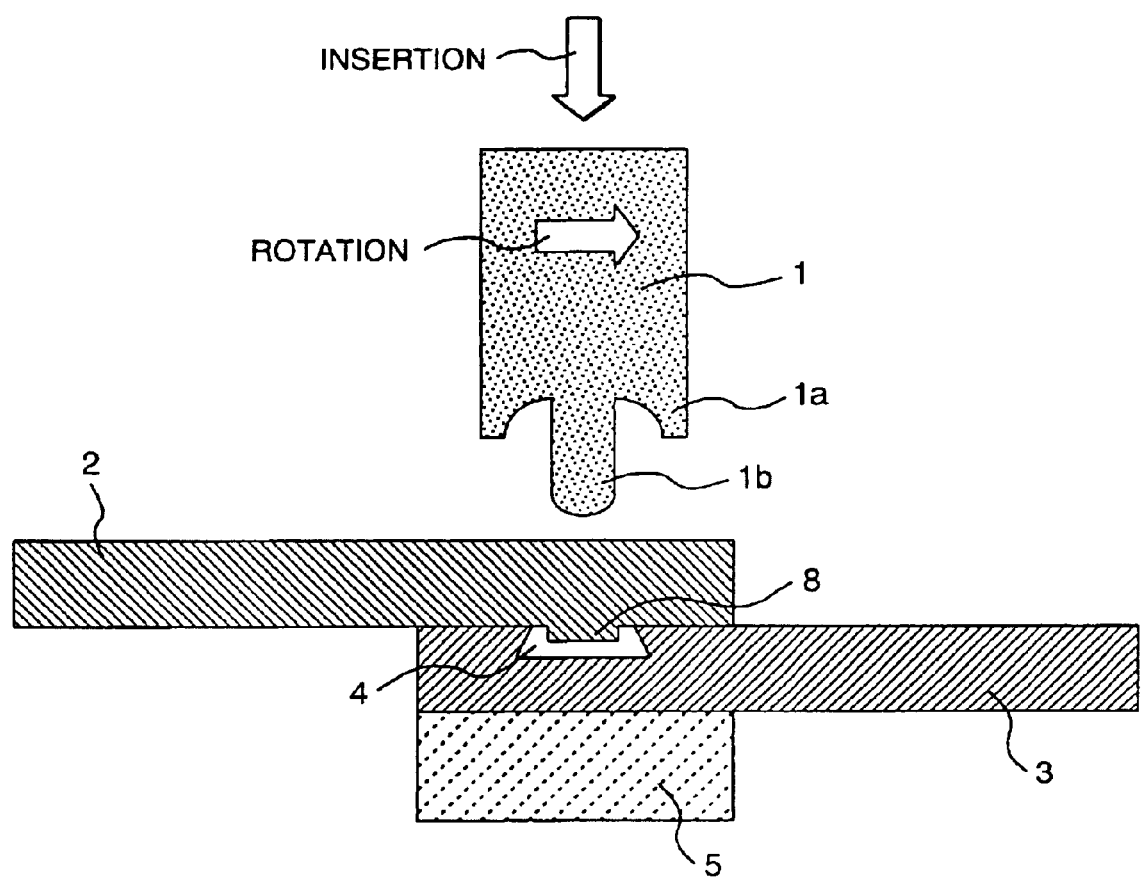
FIGS. 8, 9 and 10 show sectional views of further examples.

In the present invention, it is preferable to form a recess 8 as shown in FIG. 8 in the position which faces pit 4 of material 3 in the joining portion. The recess 8 makes filling of material 2 in pit 4 effectively.

Figure 9:
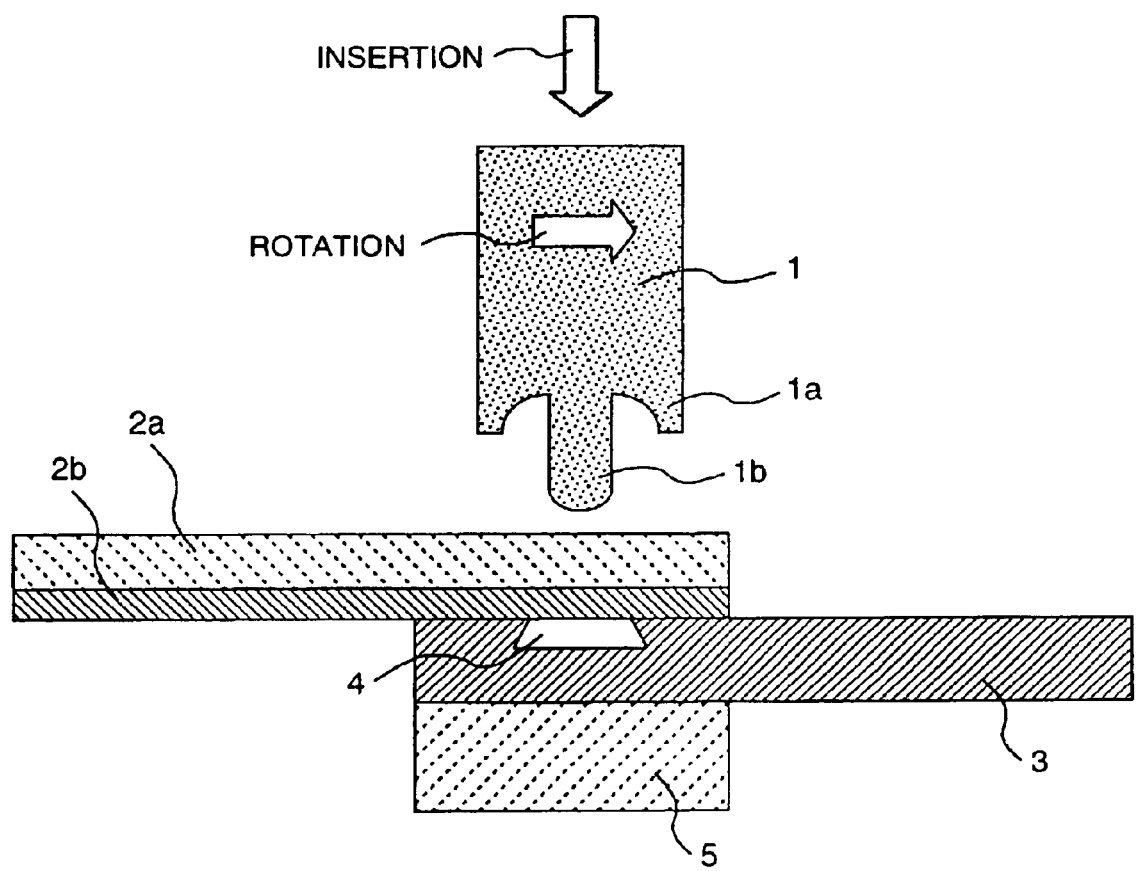
Figure 10:
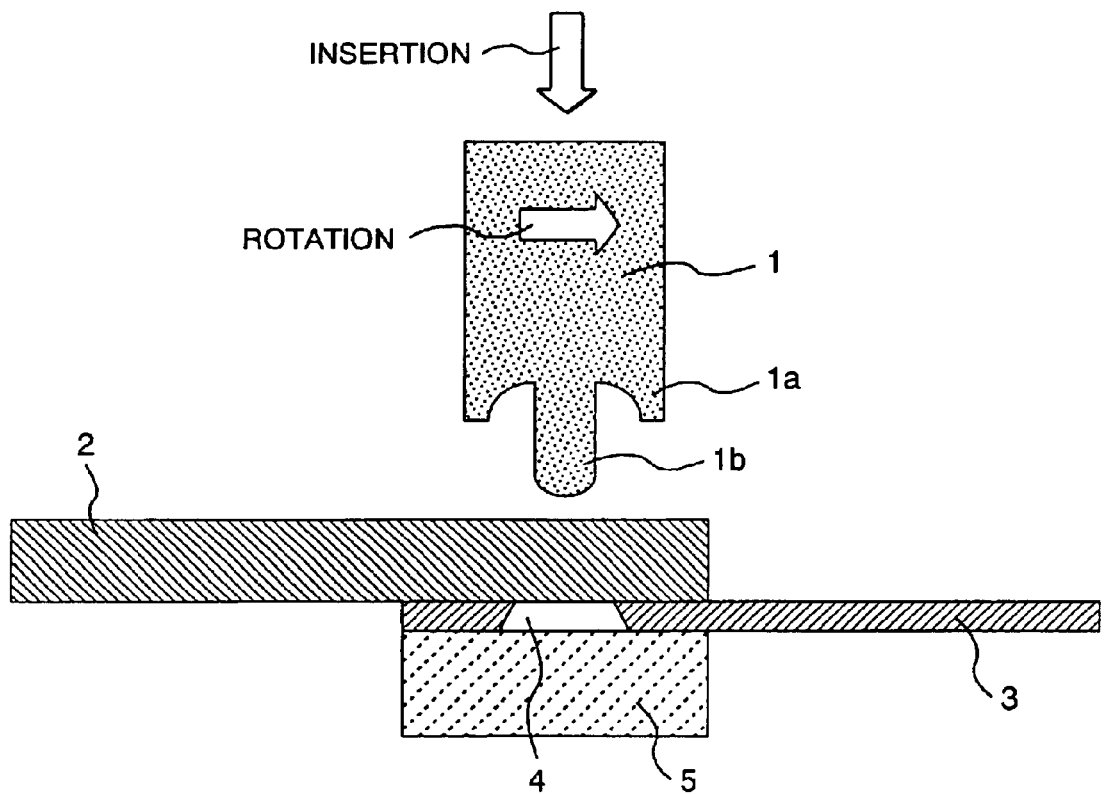

The method of the present invention can be applied to joining of three kinds of materials as shown in FIG. 9, and joining of more than three kinds of materials as well.

Figure 11:
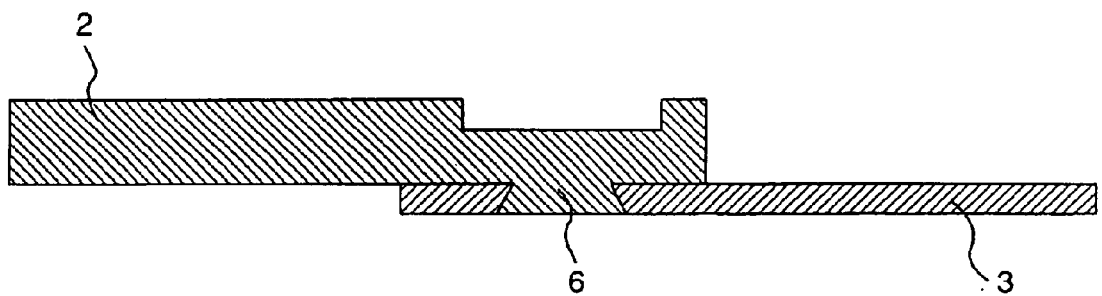
FIG. 11 shows a sectional view of a joint obtained in the further example of FIG. 10.
Figure 12:
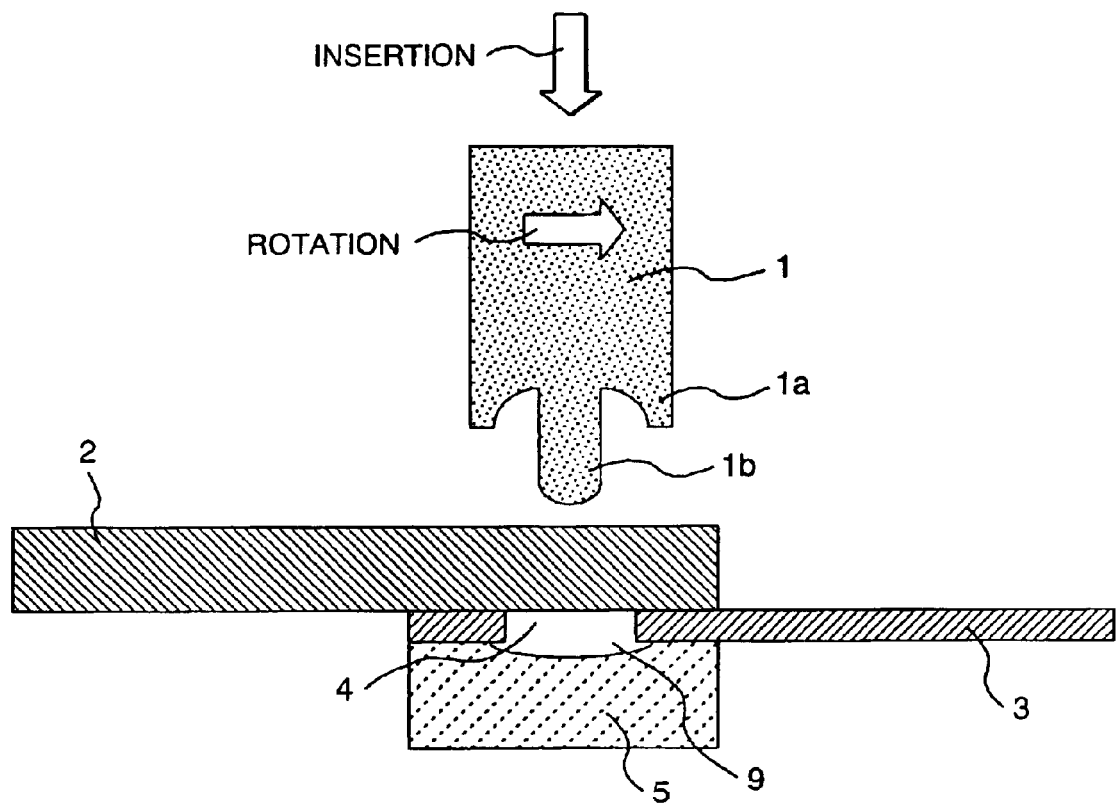
FIG. 12 shows a sectional view of a further example.

Pit 4 may penetrate through material 3 as shown in FIG. 3. However, pit 4 is filled with material 2 after providing with backing plate 5. The sectional view of the joint thus obtained is shown in FIG. 11.

Figure 13:
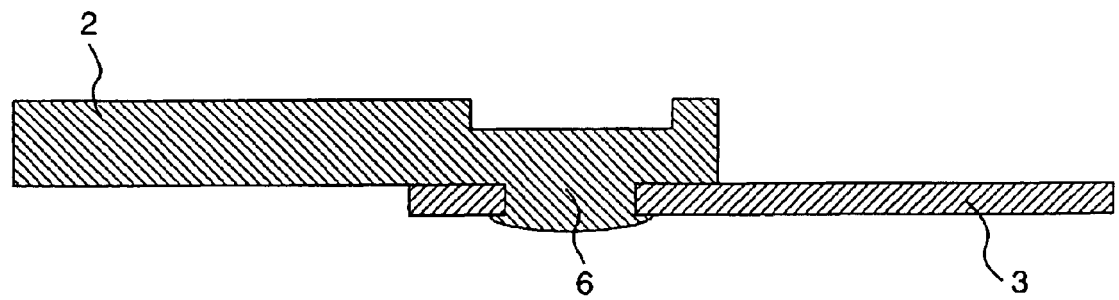
FIG. 13 shows a sectional view of a joint obtained in the further example of FIG. 12.

When pit 4 penetrates material 3, hollow 9 having a larger area than the penetration hole is formed in the backing plate 5, so that filling 6 comes out a portion beneath material 3 as shown in FIG. 13. The resulting joint is shown in FIG. 13 wherein since the lateral size of filling 6 is larger than that of pit 4, filling does not come out from the joining part. The pit formed in material 2 has such a shape that the size of the entrance is the same as that of the hollow or that several pits arranged and extended in a lateral direction are formed.

As having been described above, the joining of the present invention is performed wherein energy is given to one of materials by high speed rotation of the probe, the material is softened by friction heat to cause plastic flow of the material, and the material is filled into the pit formed in the other material by the action of pressing down or traveling of the probe. That is, the method of the present invention is a mechanical joining which employs a friction mechanical fastening using friction heat as energy source.

EXAMPLE 1

Joining of aluminum alloy JIS 6000 series and normal steel was conducted.

Figure 14:
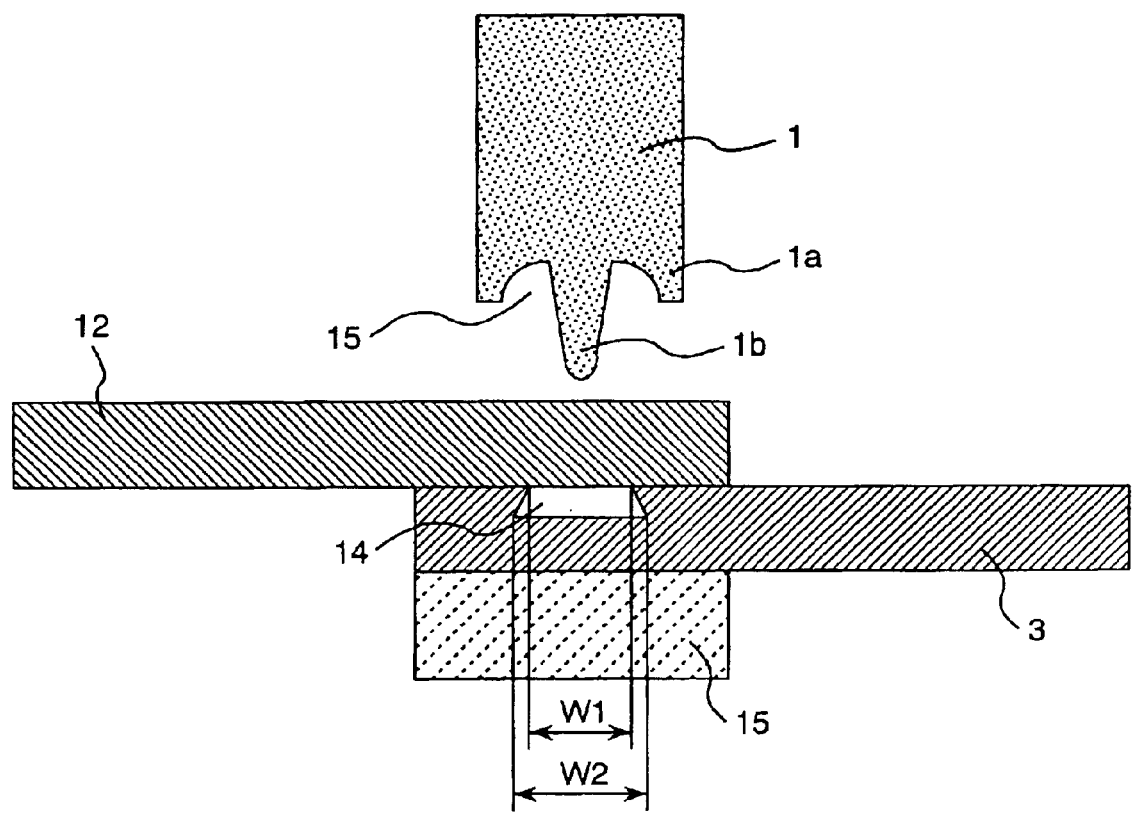
FIG. 14 shows an arrangement of materials and the probe in Example 1.

The sectional views of the aluminum alloy 12, the steel 13 and probe 1 are shown in FIG. 14. Both of the alloy 12 and steel 13 have thickness of 4 mm, width 40 mm, and length 200 mm. A joining zone of the steel 13 has a pit 14 formed throughout the whole length of the steel 13, the size of the pit being upper bottom (W1) of 3 mm, lower bottom (W2) of 5 mm and depth of 2 mm.

Aluminum alloy plate 12 and steel plate 13 were lapped by 15 mm on backing plate 5, and they were clamped firmly by a jig (not shown).

Probe 1 had a shoulder 1a whose diameter was 10 mm, pin 1b had a diameter of 3 mm at its root, and tip diameter was 2 mm. The volume of pin 1b was about 1.4 times the volume of the hollow 15 formed below shoulder 1a. Probe was rotated at 1500 rpm by means of a spindle motor (not shown), followed by insertion of probe 1 into the joining zone of aluminum alloy plate 12. The insertion speed was 10 mm/min, and insertion depth was 5.5 mm.

After insertion of the probe and followed by keeping as the are for 10 seconds, the probe 1 was moved at a speed of 300 mm/min towards the direction of the width of the steel plate, the recess 14 being formed along the width. Probe 1 was inclined backwards by 5 degrees with respect to the moving direction. According to this method, the material softened by friction heat by probe 1 and aluminum alloy 12 is stored in recess 15, and the softened material is pressed down along the moving direction.

Since the softened material has a reduced viscosity and the material is held down in the forward direction, the material generates plastic flow to fill pit 4 successively. The material filled in the pit 4 becomes viscous after probe 1 goes by, and the material 12 and steel 13 are joined at the pit 14.

A temperature of the mixed materials was measured by a thermocouple: the highest temperature was 470° C., and a period of temperatures higher than 400° C. was only a few seconds.

In case of joining between aluminum alloy and steel, the materials do not react with each other at the above temperature; no formation of intermetalic compounds was found by structure observation of the joint. Aluminum alloy was filled firmly in pit 4, so that aluminum alloy plate 12 and steel plate 13 were mechanically joined.

EXAMPLE 2

Figure 15:
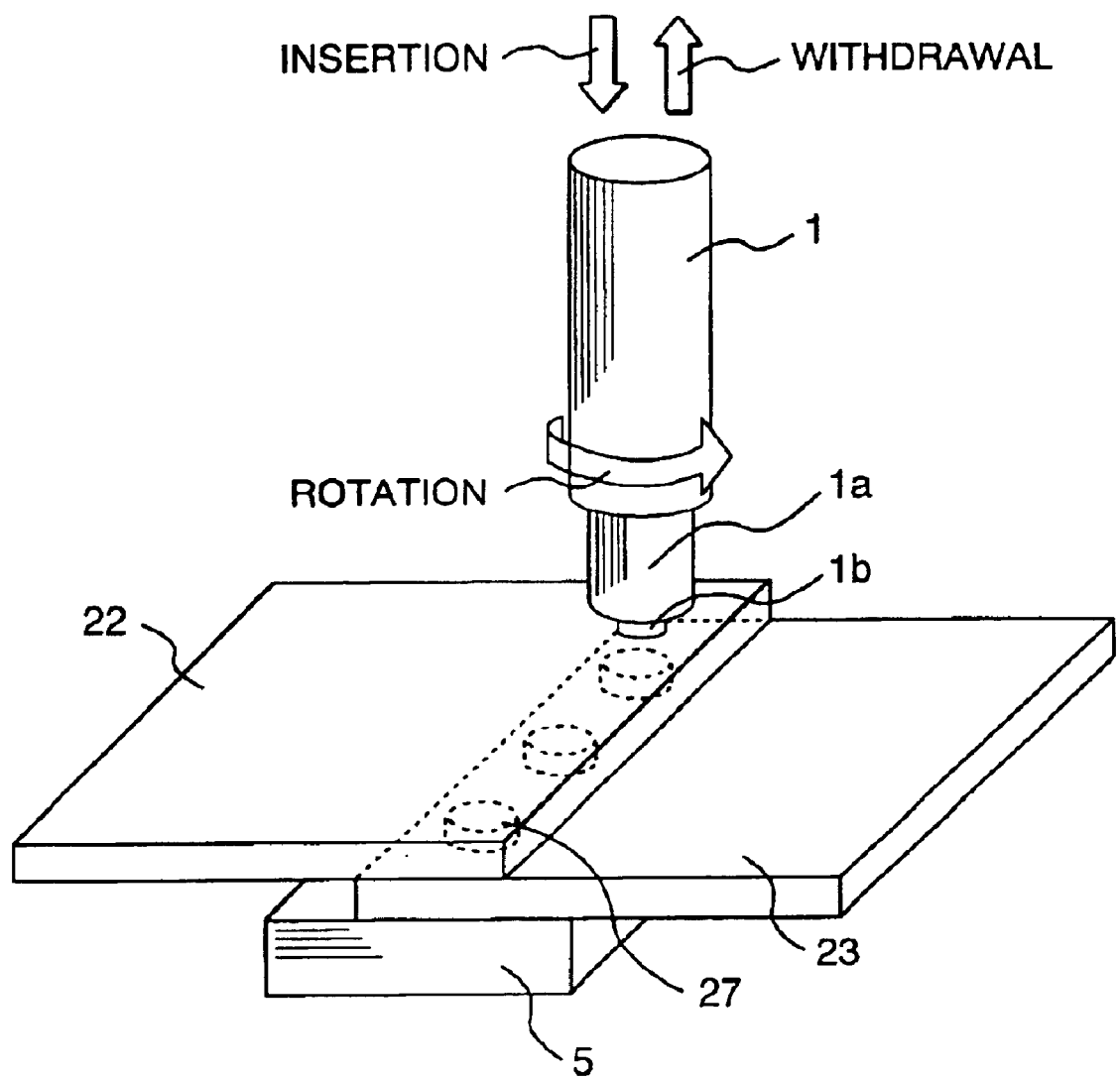
FIG. 15 shows an arrangement of materials and the probe in Example 2.

Joining between an aluminum alloy and a copper alloy was conducted. The aluminum alloy was JIS 6000 series, and the copper alloy was oxygen free copper. FIG. 15 shows the state before joining.

Aluminum alloy plate 22 had a thickness of 4 mm, and oxygen free copper plate 23 had a thickness of 2 mm, both of which have a width of 80 mm and a length of 100 mm. Three through-holes 27 corresponding to pit 4 each having a diameter of 3 mm were formed in the joining zone of oxygen-free copper.

Aluminum alloy plate 22 and oxygen-free copper plate 23 were put on a backing plate 5, the plates being lapped by 15 mm each other. They were clamped firmly with a jig (not shown). Round recess 9 having a diameter 6 mm and depth of 1 mm was formed at a position in accord with through-hole 27 above backing plate 5. The shape of probe 1 was the same as that of Example 1.

Probe 1 was rotated at 1300 rpm by means of a spindle motor (not shown), and the probe was inserted into the joining zone of aluminum alloy 22. The insertion speed of the probe was 10 mm/min and depth was 5.5 mm. The inserted probe was maintained for 10 seconds, and then withdrawn.

The temperature was measured by means of a fixed thermocouple to find that the maximum temperature was about 460° C., and a period of temperatures above 400° C. was only several seconds.

Figure 16:
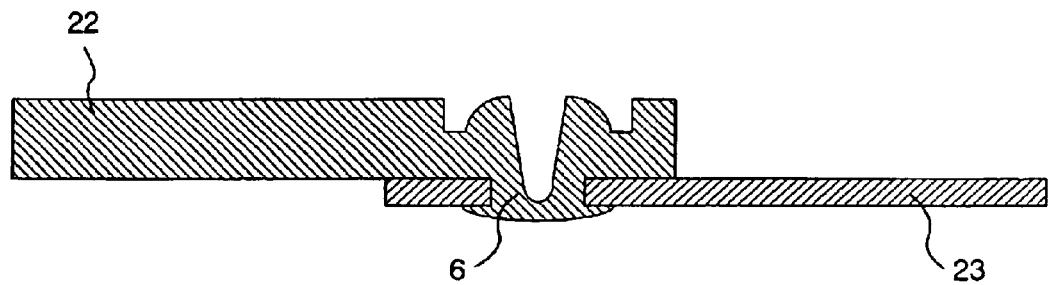
FIG. 16 shows a sectional view of the joint obtained in Example 2.

When aluminum alloy plate and copper plate are joined, there was found no intermetallic compounds through observation of the structure of the joint even if the materials are subjected to the high temperature mentioned above for a short period of time. The through-hole 27 and pit 9 were firmly filled with aluminum alloy as shown in FIG. 16.

On the surface of the aluminum alloy plate 22 there was a dimple similar to the shape of the probe, which was a transcription from the probe, but aluminum alloy plate 22 and copper plate 23 were strongly joined together.

EXAMPLE 3

In this example, joining between a pipe made of aluminum alloy JIS 6000 series and a pipe made of normal steel was conducted.

Figure 17:
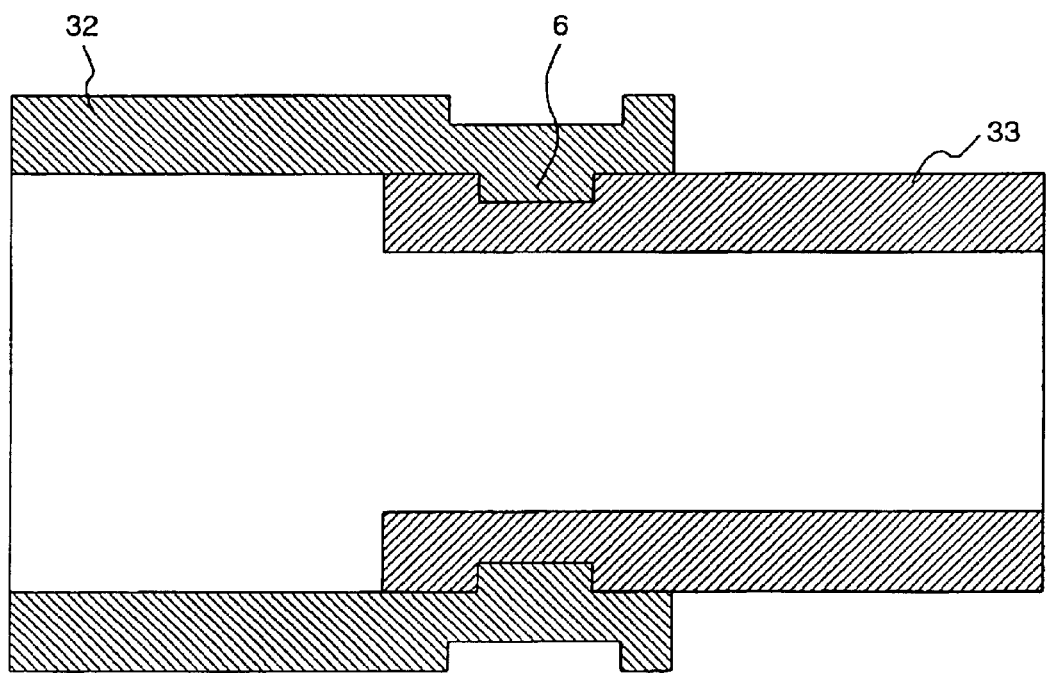
FIG. 17 shows a sectional view of the joint obtained in Example 3.

FIG. 17 shows a resulted joint in this example. Thickness of each of the pipes was 4 mm. An inner diameter of aluminum pipe 32 was 24 mm and that of normal steel pipe 33 was 16 mm. A pit having a width of 4 mm and depth of 2 mm was formed in the outer surface of the joining zone. Steel pipe 33 was inserted into aluminum alloy pipe 32, and they were fixed on a rotating table (not shown) in such a manner that an axial direction was set as a rotating direction.

In this example, a jig corresponding to the backing plate that was used in Examples 1 and 2 was not used. The shape of the probe was the same as that of Example 1.

The probe was rotated at a speed of 1400 rpm, and then it was inserted into the joining zone of the aluminum pipe 32. The insertion speed of the probe was 5 mm/min and the insertion depth was 5.5 mm. After the inserted probe was kept for 10 seconds, and then the rotating table was driven to rotate the aluminum alloy pipe and normal steel pipe. The number of rotation of the table was 2 rpm and a rotating angle was 370 degrees.

In the pit of steel pipe 33 there was firmly filled aluminum alloy, and the pipes were mechanically strongly joined. As shown in FIG. 17, uneven portion formed in the surface of the aluminum pipe was removed by lathe machining.

According to the present invention, only one of the materials to be joined is subjected to plastic flow, and as a result, no intermetallic compounds are formed at the interface of the materials.

What is claimed is:

1. A method of joining metallic materials, which comprises forming a pit in one of the materials, and effecting plastic flow of the other material to fill it in the pit, wherein the pit is formed in the material having a highest mechanical strength among the materials.

2. The method according to claim 1, wherein a probe harder than the other material is rotated to insert it into a joining zone thereof, whereby plastic flow of the other material in the joining zone is occurred by friction heat generated between the other material and the probe.

3. A method of joining metallic materials, which comprises:

forming a pit in one of the metallic materials to be joined, placing the other material above the pit, rotating a probe harder than the other material to insert it into a joining zone of the other material from the upper part of the other material, wherein the probe has a pin having a smaller diameter than that of the other portion of the probe, and has a shoulder having a larger diameter than that of the pin, the shoulder extending to the pin, and wherein the tip of the shoulder has a recess at the root of the pin, effecting plastic flow of the other material by friction heat generated by rotation of the probe, filling the plastic flow of the other material into the pit by inserting the probe thereinto, and withdrawing the probe from the joining zone.

4. The method according to claim 3, wherein the pit is formed in an extended zone in a lateral direction, and the probe and/or the metallic materials are relatively moved in the direction of the arrangement of the pit.

5. The method according to claim 4, wherein the probe is moved along the direction of the pit.

6. The method according to claim 3, wherein a projection is formed in the joining zone of the other material superimposed on the pit.

7. The method according to claim 3, wherein the shoulder has a larger diameter than the other portion and the pin has a smaller diameter than the other portion.

8. The method according to claim 7, wherein the diameter of the shoulder is larger than a width of the pit.

9. The method according to claim 7, wherein the shoulder declines outwardly so that a height of the shoulder becomes lower from the root of the pin towards its periphery.

10. The method according to claim 9, wherein when the probe is inserted into the pit, the end of the shoulder bites into the surface of the other material.

11. The method according to claim 1, wherein the pit is a through-hole that penetrates the material, and wherein the through-hole which is closed by a backing plate is filled with the other material.

12. The method according to claim 1, wherein the pit is formed in the material having both the highest mechanical strength and a highest melting temperature among the materials.

13. The method according to claim 1, wherein the materials constitute a double layered pipe composed of an inner pipe and an outer pipe, one of the inner pipe and outer pipe having the pit in the joining zone.

14. The method according to claim 1, wherein one of the materials is an aluminum alloy and the other is steel, the steel having the pit.

15. The method according to claim 1, wherein one of the materials is an aluminum alloy and the other is a copper alloy, the copper alloy having the pit.

16. The method according to claim 3, wherein the probe is inserted in such a manner that the tip of the probe does not touch the bottom of the pit.

17. The method according to claim 3, wherein in said filling the plastic flow of the other material into the pit, there is substantially no mixing of (1) the one of the metallic materials to be joined and (2) the other material.

18. The method according to claim 3, wherein only said other material is plasticized by said friction heat generated by rotation of the probe.

19. The method according to claim 3, wherein the pit has a configuration that a dimension thereof at an entrance to the pit is smaller than said dimension at the bottom of the pit.

20. The method according to claim 3, wherein the pit has a configuration that a diameter thereof at an entrance to the pit is smaller than a diameter at the bottom of the pit.

21. A method of joining metallic materials, which comprises forming a pit in one of the materials, and effecting plastic flow of the other material to fill it in the pit, wherein the pit is formed In the material having a highest melting temperature among the materials.

* * * * *